J. W. HOLLENBECK.
Wagon-Bolt.
No. 162,552.              Patented April 27, 1875.
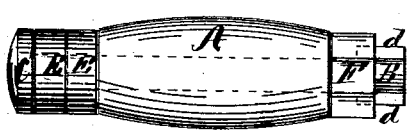
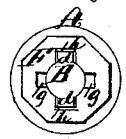
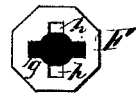
Witnesses:
Franklin Barritt
Richard Gerner
Inventor:
John W. Hollenbeck,
Per
Henry Gerner,
Att'y.

UNITED STATES PATENT OFFICE.

JOHN W. HOLLENBECK, OF AURORAVILLE, WISCONSIN.

IMPROVEMENT IN WAGON-BOLTS.

Specification forming part of Letters Patent No. 162,552, dated April 27, 1875; application filed March 11, 1875.

*To all whom it may concern:*

Be it known that I, JOHN W. HOLLENBECK, of Auroraville, Waushara county, State of Wisconsin, have invented certain Improvements in Bolts, of which the following is a specification:

The object of my invention is to provide for a locking device for bolts, especially those used in wagon-clips, by aid of which the bolt is prevented from becoming accidentally detached, and may be readily removed or attached at any time without aid of tools or any implement whatever.

My invention consists in the construction of a self-locking and adjustable bolt. The bolt is made of sufficient length to extend over both the collars of a wagon-clip, and leaving space for a rubber spring, which is placed between the head of the bolt and the collar of the clip. The other end of the bolt is provided with two projections or lugs, placed opposite to each other on the extreme end of the bolt. A washer, with corresponding slots on the inside, is placed between these lugs and the end of the clip. Two recesses are also cut in the outer face of the washer, near to the hole in the same, in which the projections of the bolt rest when the bolt is locked.

In order to unlock the bolt, the head is pushed against the rubber spring, and the bolt thus brought forward until the lugs are clear of the recesses, and the bolt is then turned until the lugs come opposite the slots in the washer, and the bolt can thus be withdrawn from the clip.

In order to describe my invention more fully, I refer to the accompanying drawing forming a part of this specification.

Figure I is a side view of a bolt inserted in a wagon-clip embodying my invention. Fig. II is an end view of the same, and Fig. III is a detached end view of the washer.

A represents part of the wagon-clip. B is the bolt, with head $c$ and lugs $d\ d$. E is the rubber spring. F is the washer, with slots $g\ g$ and recesses $h\ h$.

I am aware that other devices have been invented and patented for producing a similar result. These devices are, however, of a different construction than mine. Patent No. 84,940, December 15, 1868, granted to E. Finn, and Patent No. 121,841, December 12, 1871, granted to Bernhard Berndt and Franz Barsch, describe improvements in bolts producing results somewhat similar to mine. In disclaiming my intention to interfere with these patents, I desire to claim—

The lugs $d$ on the end of bolt B, in combination with the washer F, with slots $g$ and recesses $h$, and spring E and clip A, substantially as described.

JOHN W. HOLLENBECK.

Witnesses:
C. D. FARMER,
G. D. FARMER.